United States Patent [19]
Lindquist et al.

[11] Patent Number: 5,867,549
[45] Date of Patent: Feb. 2, 1999

[54] INHIBITION OF SILICA DISSOLUTION IN AN AQUEOUS ENVIRONMENT

[75] Inventors: Kenneth O. Lindquist, Saugerties; Thomas C. Haley, Troy, both of N.Y.

[73] Assignee: Electric Power Research Institute, Inc., Palo Alto, Calif.

[21] Appl. No.: 715,540

[22] Filed: Sep. 18, 1996

[51] Int. Cl.$^6$ .............................. G21C 19/07; C09K 5/00
[52] U.S. Cl. .................... 376/306; 252/383; 252/478; 376/310; 588/20; 588/901
[58] Field of Search ...................... 252/600, 478, 252/383; 376/310, 309, 306; 210/682; 588/20, 901

[56] References Cited

U.S. PATENT DOCUMENTS

| | | | |
|---|---|---|---|
| 4,176,093 | 11/1979 | Zoch ........................................ | 252/478 |
| 4,332,031 | 5/1982 | Barkatt et al. ........................... | 376/313 |
| 4,746,487 | 5/1988 | Wachter .................................. | 376/272 |
| 4,780,268 | 10/1988 | Papai et al. ............................. | 376/272 |
| 4,880,595 | 11/1989 | Matsuda et al. ........................ | 376/313 |
| 5,361,281 | 11/1994 | Porowski ................................ | 376/272 |

FOREIGN PATENT DOCUMENTS

07063888   3/1995   Japan .

OTHER PUBLICATIONS

"Data Plots for Boraflex Performance as a Function of Time", EPRI Workshop #7, Boraflex Update, RP–2813–4, Jul. 28, 1993.

*Radiation–Induced Changes in the Physical Properties of Boraflex™, a Neutron Absorber Material for Nuclear Applications*, Journal of Nuclear Materials 217(1994), pp. 223–228

*Nuclear Analysis for the Boraflex used in a Typical Spent–Fuel Storage Assembly*, Nuclear Technology, vol. 109, Mar. 1995, pp. 357–365.

*An Assessment of Boraflex Performance in Spent–Nuclear–Fuel Storage Racks*, EPRI Report NP–6159, Dec. 1988.

*Boraflex Test Results and Evaluation*, EPRI Report TR–101986, Feb. 1993.

*Guidelines for Boraflex Use in Spent–Fuel Storage Racks*, EPRI Report TR–103300, Dec. 1993.

*Primary Examiner*—Benjamin Utech
*Assistant Examiner*—Deanna Baxam
*Attorney, Agent, or Firm*—Flehr Hohbach Test Albritton & Herbert LLP

[57] ABSTRACT

Methods are provided to at least slow the dissolution of silica in an aqueous environment. In the subject methods, the silica surface is contacted with a multivalent metal cation capable of complexing with oxygen atoms present on the silica surface, where contacting is preferably accomplished by introducing a source of the multivalent metal cation into the aqueous environment. The subject methods find particular use in the inhibition of the dissolution of silica comprising neutron poisoning materials employed in the storage of spent nuclear fuel.

12 Claims, No Drawings

INHIBITION OF SILICA DISSOLUTION IN AN AQUEOUS ENVIRONMENT

FIELD OF THE INVENTION

The field of this invention is spent nuclear fuel storage.

INTRODUCTION

In the storage of spent nuclear fuel, spent fuel rods are typically placed in storage racks submerged in water. Associated with the storage racks are neutron poisoning materials which serve to absorb neutrons emitted from the reactive spent-fuel rods. One neutron absorbing material which has found widespread use since the late 1970s comprises boron carbide trapped in a matrix of polydimethylsiloxane, which material is marketed under the tradename Boraflex™.

Initially, the Boraflex™ material has a shiny black appearance, and is elastomeric. However, as the material is exposed over time to gamma radiation in the aqueous environment of the submerged spent-fuel racks, it loses its elastomeric properties and begins to change in appearance to a dull grey color. The loss of rubber elasticity is associated with a process in which gamma radiation results in the cross linking of polysiloxane strands of the material. Continued exposure to gamma radiation in the aqueous environment eventually results in its change in appearance, which is caused by the conversion of the material to silica or a silica dominated material. The resultant silica or silica dominated matrix is then subsequently susceptible to salvation in the aqueous environment of the storage system. Eventually, as the silica dissolves, the entrapped boron carbide is lost and a concomitant decrease in neutron absorbance capacity by the material occurs.

Therefore, there is interest in the development of a method for inhibiting the dissolution of silica comprising materials in the aqueous environment of a spent nuclear fuel storage system which would preserve the integrity and extend the lifetime of the neutron poisoning material. Ideally, such a method would be simple and employ relatively inexpensive materials.

RELEVANT LITERATURE

U.S. Patents describing the use of Boraflex™ in the storage of radioactive materials included U.S. Pat. Nos. 4,521,691 and 4,746,487.

Other references describing the properties of Boraflex™, particularly following gamma radiation exposure in aqueous environments include: Lindquist et al., "Radiation-Induced Changes in the Physical Properties of Boraflex™, a Neutron Absorber Material for Nuclear Applications," J. Nuclear Materials (1994) 223–228, Jun & Song, "Nuclear Analysis for the Boraflex™ Used in a Typical Spent-Fuel Storage Assembly," Nuclear Technology (1995) 109:357-365; EPRI NP-6159 entitled "An Assessment of Boraflex Performance in Spent-Nuclear-Fuel Storage Racks,"(1988); EPRI TR-101986 entitled "Boraflex Test Results and Evaluation," (1993) and EPRI TR-103300 entitled "Guidelines for Boraflex Use in Spent-Fuel Storage Racks," (1993), the last three of which references may be obtained by contacting EPRI Distribution Center, 207 Coggins Drive, P.O. Box 23205, Pleasant Hill, Calif. 94523.

SUMMARY OF THE INVENTION

Methods are provided to at least slow the dissolution of silica in an aqueous environment. In the subject methods, a multivalent metal cation is contacted with the surface of the silica material, preferably through introduction of a soluble source of the metal cation into the aqueous environment. The subject methods find particular use in preventing the dissolution of irradiated Boraflex™ in the aqueous environment of a submerged spent nuclear fuel rack.

DESCRIPTION OF THE SPECIFIC EMBODIMENTS

Methods are provided to at least slow the solvation of silica in an aqueous environment. In the subject methods, a source of a multivalent metal cation is contacted the surface of the silica. Contact of the multivalent metal cation with the surface of the silica results in complexing of the metal cation with oxygens on the surface of the silica. Complexing of the metal cations on the surface at least retards, if not substantially inhibits, solvation of the silica. The subject method finds particular use in the preservation of gamma irradiated silica comprising neutron poisoning materials commonly used in the aqueous storage systems of spent nuclear fuel.

In the subject invention at least one type of metal cation, usually not more than four different types, more usually not more than two different types of metal cation will be contacted with the silica surface. The multivalent metal cation employed in the subject invention will be a di-, tri-, or tetravalent metal cation capable of complexing with a plurality of oxygen atoms, usually 3 to 4 oxygen atoms, present on the surface of the silica. Of particular interest as multivalent metal cations are cations of Group II, Group IIb, Group III, Group IV or Group V metals. Cations of interest include: (a) cations of Group II metals such as beryllium, magnesium, calcium, strontium and barium; (b) cations of Group III metals, such as aluminum, scandium, yttrium and lanthanum; (c) cations of Group IIb metals, such as zinc and cadmium; (d) cations of Group IV metals such as tin, lead and zirconium; and (e) cations of Group V metals such as antimony and bismuth; and the like.

Contact of the silica surface with one or more different types of multivalent metal cation is accomplished by introducing a source of the cation into the aqueous environment of the silica. Typically, the source of multivalent metal cation is a metal compound which dissociates into ions upon introduction into the aqueous environment. Metal compounds of interest include borates, borides, carbides, carbonates, chlorates, chlorides, hydroxides, nitrates, nitrides, oxalates, oxides, phosphates, silicates, sulfates, sulfides, and the like.

The amount of multivalent metal cation source that is introduced into the aqueous environment is sufficient to raise the concentration of metal cation in the aqueous environment to a level which ensures that enough metal cation reaches the silica surface, and concomitantly complexes with oxygen atoms present thereon, to sufficiently slow the rate of silica dissolution. Generally, the amount of multivalent metal cation source introduced into the aqueous environment is sufficient to provide for a metal cation concentration that ranges from about 1.0 to 10 ppm, usually from about to 1.0 to 5.0 ppm, and more usually from about 1.0 to 2.0 ppm.

The subject method results in at least a slowing of the rate of silica dissolution in the aqueous environment of the silica. By at least slowing is meant that the rate at which silica goes into solution following treatment according to the subject invention is slower than the rate at which untreated silica goes into solution, where the dissolution of the silica material can be substantially inhibited with the subject method. By substantially inhibited is meant that substantially no silica goes into solution in the aqueous environment following treatment according to the subject method.

The subject method finds use in situations where it is desired to inhibit the dissolution of silica in an aqueous environment, where the silica may be present in a composite material, i.e. a silica comprising material. The temperature of the aqueous environments in which the subject method finds use may range from 32° to 212° F., usually from about 60° to 180° F. and more usually from about 75° to 125° F.

The subject method finds particular use in the preservation of silica comprising neutron poisoning materials that are employed in aqueous spent nuclear fuel storage systems. Silica comprising neutron poisoning materials that may be treated according to the invention include those materials produced by gamma irradiation of polysiloxane matrices, particularly polydimethylsiloxane matrices, comprising a neutron poisoning agent, such as boron carbide, aluminum-boron, cadmium and gadolinium. In particular, the subject methods find use in at least slowing, if not substantially stopping, the degradation of Boraflex™ due to silica dissolution in the aqueous environment of spent nuclear fuel storage systems.

In practicing the subject method, the silica comprising material can be present in the aqueous environment prior to the contact of the surface of the silica comprising material with the multivalent metal cation, e.g. through introduction of a source of such cation into the aqueous environment, or the silica comprising material can be placed in an aqueous environment already comprising a source of multivalent metal cation in sufficient concentration, where in either situation one is: (a) providing for a silica comprising material in an aqueous environment and (b) contacting the surface of the silica comprising material with a multivalent metal cation.

The following examples are offered by way of illustration and not by way of limitation.

EXPERIMENTAL

Two sets of four separate aging baths comprising deionized water and the following zinc concentrations were prepared: bath set # 1, Zn=0.0 ppm; bath set # 2, Zn=0.1 ppm; bath set # 3, Zn=1.0 ppm; bath set # 4, Zn=10.0 ppm. Samples of Boraflex™ (obtained from BISCO (Brand Industrial Services Corp., Park Ridge, Ill.)) were irradiated to $1\times10^{10}$ rads in a cobalt-60 facility at the Armed Forces Radiology Research Institute and were placed in each of the baths, where the first member of each set was maintained at 85° F. and the second member was maintained at 150° F. Each aging bath solution was sampled and tested periodically to determine the reactive silica level in the bath ($SiO_2/cm^2$ of Boraflex™) as a function of time. It was observed that for zinc levels in the range of 1 to 10 ppm, the quantity of silica in the aging baths was reduced by as much as a factor of 3 relative to an aging bath without zinc.

The dissolution rate of the Boraflex™ was also studied and it was observed that with zinc levels present in concentrations of 1 ppm or greater, the dissolution rate was reduced to a level 20 to 25% of the rate observed in the absence of zinc.

It is evident from the above results and discussion that a simple method is provided which can substantially slow, if not inhibit, the dissolution of silica or a silica comprising material in an aqueous environment. As the method is simple and employs inexpensive materials, it is particularly suited for use in the preservation of silica comprising neutron poisoning materials which find use in spent nuclear fuel storage systems, such as Boraflex™.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A method for slowing the dissolution of a solid silica-comprising material in an aqueous environment of a spent nuclear fuel storage system, said method comprising:

contacting the surface of said solid silica-comprising material in an aqueous environment of a spent nuclear fuel storage system with a multivalent metal cation selected from the group consisting of divalent metal cations, trivalent metal cations and tetravalent metal cations.

2. The method according to claim 1, wherein said contacting step comprises the step of introducing a source of said multivalent metal cation into said aqueous environment.

3. The method according to claim 2, wherein said source of multivalent metal cation is a metal salt or a metal oxide.

4. The method according to claim 1, wherein said solid silica-comprising material is produced by gamma irradiation of a polysiloxane matrix comprising a neutron poisoning agent.

5. The method according to claim 4, wherein said neutron poisoning agent is selected from the group consisting of boron carbide, aluminum-boron, cadmium and gadolinium.

6. The method according to claim 4, wherein said polysiloxane matrix is polydimethylsiloxane.

7. A method for slowing the dissolution of a solid silica-comprising material in an aqueous environment of a spent nuclear fuel storage system, wherein said solid silica-comprising material is produced by gamma irradiation of a polysiloxane matrix comprising a neutron poisoning agent, said method comprising:

introducing a source of a multivalent metal cation selected from the group consisting of divalent metal cations, trivalent metal cations and tetravalent metal cations into said aqueous environment of a spent nuclear fuel storage system.

8. The method according to claim 7, where said source of multivalent metal cation is a metal compound.

9. The method according to claim 8, wherein said metal compound is a compound of a Group II, Group II*b*, Group III, Group IV or Group V metal.

10. A method for slowing the dissolution of a solid silica-comprising material in an aqueous environment of a spent nuclear fuel storage system, wherein said solid silica-comprising material is produced by gamma irradiation of a polydimethylsiloxane matrix comprising boron carbide, said method comprising:

introducing a zinc compound into said aqueous environment of a spent nuclear fuel storage system.

11. The method according to claim 10, where said zinc compound is introduced into said aqueous environment in an amount sufficient to provide a concentration of zinc in said aqueous environment ranging from about 1.0 to 10 ppm.

12. The method according to claim 10, wherein said polydimethylsiloxane matrix comprising boron carbide is polydimethylsiloxane.

* * * * *